(12) United States Patent
Souca

(10) Patent No.: US 7,556,584 B2
(45) Date of Patent: Jul. 7, 2009

(54) VARIABLE SPEED DRIVE FOR A CONTINUOUSLY VARIABLE TRANSMISSION

(75) Inventor: Nicolae Souca, Baden-Baden (DE)

(73) Assignee: Luk Lamellen und Kupplungsbau Betelligungs KG, Bühl (DE)

( * ) Notice: Subject to any disclaimer, the term of this patent is extended or adjusted under 35 U.S.C. 154(b) by 0 days.

(21) Appl. No.: 11/827,671

(22) Filed: Jul. 12, 2007

(65) Prior Publication Data

US 2008/0020892 A1 Jan. 24, 2008

Related U.S. Application Data

(63) Continuation of application No. PCT/DE2005/002274, filed on Dec. 17, 2005.

(30) Foreign Application Priority Data

| Jan. 15, 2005 | (DE) | ................. | 10 2005 001 975 |
| Jun. 14, 2005 | (DE) | ................. | 10 2005 027 303 |

(51) Int. Cl.
  *F16H 15/38* (2006.01)
(52) U.S. Cl. ............................ 476/53; 476/33; 476/50
(58) Field of Classification Search .................. 76/52, 76/53, 27, 33, 50
See application file for complete search history.

(56) References Cited

U.S. PATENT DOCUMENTS

| 2,205,031 A | * | 6/1940 | Bugden | ..................... 476/48 |
| 4,183,253 A | | 1/1980 | Borello | ..................... 476/16 |

FOREIGN PATENT DOCUMENTS

| DE | 22 20 089 A1 | 11/1973 |
| DE | 198 04 011 A1 | 8/1999 |

* cited by examiner

*Primary Examiner*—William C Joyce
(74) *Attorney, Agent, or Firm*—Alfred J. Mangels

(57) ABSTRACT

A variable speed drive for a continuously variable transmission includes a first transmission element that is rotatable about a first rotational axis and has a convexly-curved transmission surface that is rotationally symmetrical about a first rotational axis. A second transmission element is rotatable about a second rotational axis and has a concavely-curved transmission surface that is rotationally symmetrical about a second rotational axis parallel to the first rotational axis. The curved transmission surfaces face each other and a rigid transmission ring is positioned between and in contact with the curved transmission surfaces to transmit torque therebetween. The position of the ring on the curved surfaces is adjustable to vary the transmission ratio. The transmission surfaces are parallel to each other at least within the adjustment range of the transmission ring.

28 Claims, 2 Drawing Sheets

VARIABLE SPEED DRIVE FOR A CONTINUOUSLY VARIABLE TRANSMISSION

CROSS-REFERENCE TO RELATED APPLICATION

This is a continuation of International Application Serial No. PCT/DE2005/002274, with an international filing date of Dec. 17, 2005, and designating the United States, the entire contents of which is hereby incorporated by reference to the same extent as if fully rewritten.

BACKGROUND OF THE INVENTION

1. Field of the Invention

The present invention relates to a variable speed drive unit for a continuously variable transmission, in particular a CVT transmission. The function of the variable speed drive in such a transmission is to transmit the torque of an input shaft to an output shaft, whereby the transmission ratio condition between the input shaft and the output shaft is freely adjustable within a transmission ratio range.

2. Description of the Related Art

In known variable speed drives for continuously variable transmissions, chains or metal bands are used, which are engaged for example with conical transmission surfaces on the input and output shafts.

It is also known to provide variable speed drives for CVT transmissions without chains or metal bands. For example, there are so-called "half-toroidal CVTs," in which the motion is transmitted between two toroidal surfaces by means of an adjustable intermediate disk. In that case the transmission of power necessitates high contact pressure forces, which leads, in turn, to large, increasing reaction forces in the element pairings of the variable speed drive. Therefore, in such variable speed drives that transmit torque between two toroidal surfaces a plurality of intermediate disks are mounted between the toroidal disks, and/or a plurality of variable speed drives are mounted in parallel, so that the high contact pressure forces can be reduced and/or higher torques can be transmitted.

An alternative is a so-called conical ring variable speed drive, which also manages without a chain or metal band, but works instead with a rigid transfer ring. The torque is thereby transmitted by means of a ring wheel between two opposing cone-shaped surfaces, which are rotatably mounted by means of two parallel axes. The spread of the transmission ratio is limited by the proportion between the smallest and largest diameter of the cone.

An object of the invention is to provide a variable speed drive for a continuously variable transmission, in particular a CVT transmission, which permits a wide spread of the transmission ratio and operates quietly. At the same time, it should be possible to produce the variable speed drive inexpensively.

SUMMARY OF THE INVENTION

The present invention is based on the objective of avoiding the very expensive design of a chain for variable speed drives, which has a complex and complicated geometry because of its many links and is relatively noisy in operation, in part due to the movement of the chain links relative to each other. Therefore a rigid ring element, which is simple to manufacture, is used as the transmitting element. Thereby, operating noises that arise due to the chain links, and in particular their movability relative to each other, are avoided. In order to be able to provide wide spreads in the variable speed drive at the same time, pairing of a convexly and a concavely curved transmission surface is chosen, along which a transmission ring can be moved. Since the points of contact of the transmission ring on the transmission surfaces lie not on a straight path but on a curved path, and thus the kinematic radii which determine the transmission ratio vary more greatly than linearly, corresponding to the curvature, spreads of the transmission ratio over a broad range are possible. Furthermore, as a result of the combination of convex and concave transmission surfaces, even a shift of the transmission ring over a short distance results in a significant change in the transmission ratio, since the change in the kinematic radii of the variable speed drive is not linear.

Hence the variable speed drive for a continuously variable transmission provides for a first transmission element which is rotatable around a first axis of rotation and has a convexly curved transmission surface which is rotationally symmetrical about the first axis of rotation, a second transmission element which is rotatable about a second axis of rotation and has a concavely curved transmission surface which is rotationally symmetrical about the second axis of rotation. A rigid transmission ring is provided whose position relative to the transmission surfaces is adjustable within an adjustment range and which can be pressed against both transmission surfaces to transmit torque between the first and the second transmission surfaces. The lines of intersection of the transmission surfaces with a plane passing through the axes of rotation are parallel, at least within the range of motion of the transmission ring.

According to a first embodiment, at least the first or the second transmission element is movable in the axial direction of its axis of rotation. That makes it possible to ensure good contact pressure of the transmission ring against the transmission surfaces.

Preferably, the convexly curved transmission surface is a spherical surface and the concavely curved transmission surface is a toroidal surface. That arrangement permits especially large spreads, so that the transmission ratio condition responds sensitively to a movement of the transmission ring.

It is preferred that the spherical surface and the generating circle of the toroidal surface have the same center of curvature, and for the radius r2 of the toroidal surface to be the sum of the radius r1 of the spherical surface and d, where d is the smallest distance between the toroidal surface and the spherical surface. This smallest distance d also lies in the cutting plane that passes through the two axes of rotation of the first transmission element and the second transmission element, respectively. The width of the transmission ring is then d.

Preferably the center of curvature of the transmission ring, which is preferably an annulus, is also located on the extension of the radii of the spherical surface and of the generating circle of the toroidal surface. That makes it possible to ensure good contact pressure and easy repositioning of the ring by tipping the ring out of the position in which it is perpendicular to the tangent at the points of tangency to the transmission surfaces.

According to a preferred embodiment, the arrangement also includes an adjusting device for adjusting the transmission ring position which in an adjustment process first displaces the transmission ring from its position perpendicular to the transmission surfaces. Because of the inclination of the ring relative to the transmission surfaces, the ring can position itself freely as a function of the direction of movement of a gas pedal. The moment needed for adjustment is supplied from outside by a motor, for example an electric motor.

Preferably the convex transmission surface, in particular a spherical surface, is provided on the input transmission element, and the concave transmission surface, in particular the toroidal surface, is provided on the output transmission element.

Preferably the axes of rotation of the first and second transmission elements are parallel to each other. That makes it possible to ensure good contact pressure between the transmission surfaces, and reliable transmission of torque.

According to a preferred embodiment, a variable speed drive arrangement is provided which includes a plurality of variable speed drives having the above-identified features.

In particular, preferably two variable speed drives are provided which are situated axially symmetrically to each other, the axis of symmetry of the arrangement being perpendicular to the axes of rotation of the transmission elements, which are parallel to each other. Alternatively, preferably four variable speed drives are provided, the variable speed drives being situated axially symmetrically in reference to an axis of symmetry which is perpendicular to the parallel axes of rotation of the transmission elements, and axially symmetrical relative to the common axis of rotation of the transmission elements with the concave transmission surfaces.

BRIEF DESCRIPTION OF THE DRAWINGS

The invention will be described below based on the example of the accompanying FIGS., which show the following.

DESCRIPTION OF THE PREFERRED EMBODIMENTS

Figure 1:
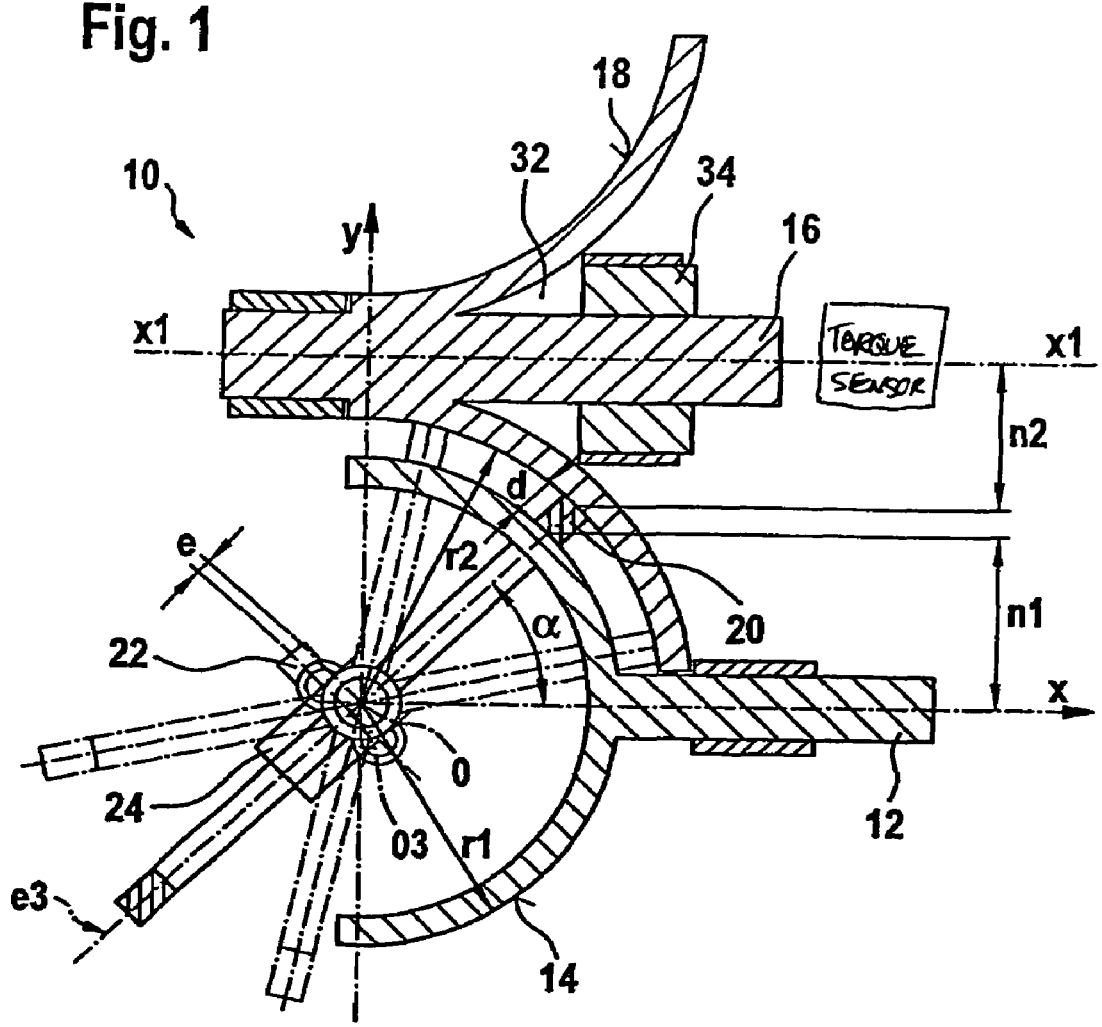
FIG. 1 is a cross-sectional view through a variable speed drive in a plane which passes through the axes of rotation of the input transmission element and the output transmission element.

FIG. 1 shows a cross section through a variable speed drive in accordance with one embodiment of the present invention. The plane of the cross section is the plane in which the elements that transmit the torque between the input and output shafts bear against each other. The variable speed drive 10 includes a first shaft 12, which is supported in a housing (not shown) so that it can rotate around the axis of rotation x. On one end of the shaft 12 is a first transmission surface 14, which is non-rotatably connected to the shaft 12 or is fabricated integrally with it.

The first transmission surface 14 is formed by the external surface of a segment of a sphere, approximately a hemisphere, which is attached to rotating shaft 12 so that the rotational axis of symmetry axis of the spherical surface coincides with the axis of rotation x. In addition, the spherically curved transmission surface 14 is connected to the shaft 12 in such a way that it is convex in the direction of the shaft 12. The spherical surface has a radius r1. Preferably, the first transmission surface 14 is formed at least as the part of a sphere corresponding to a hemisphere, so that the variation of the radial distance from axis x of an imaginary first ring surface running along the hemisphere with its center point on the x axis and running perpendicular to the x axis can be utilized to vary the transmission ratio. The radial distance n1 of that ring from axis x, which corresponds to the first kinematic radius of the variable speed drive, thus varies within the range $0 < n1 \leq r1$.

As shaft 12 rotates around axis x, the essentially hemispherical first transmission surface 14 turns with it and likewise rotates around axis x. Convexly curved spherical transmission surface 14 together with shaft 12 forms an input transmission element, which rotates at the speed of the engine (not shown) of a motor vehicle, for example.

Variable speed drive 10 also includes a second shaft 16, whose axis x1 is parallel to axis x of the first shaft 12. Shaft 16 is also rotatably supported in a housing (not shown). A second transmission surface 18 is non-rotatably connected to second shaft 16 or is fabricated integrally with it.

The second transmission surface 18 is formed as part of a toroidal surface, the generating circle of the torus having the same center point 0 as the hemispherical first transmission surface 14. It has a radius r2 which is greater than the radius r1 of the hemispherical first transmission surface 14 by a distance d, and as its toroidal generating axis the axis x1, that is, the axis of rotation of the second transmission element. Thus, the second transmission surface 18 of the second transmission element is produced by the part of a toroidal surface that corresponds to a rotation of approximately a quarter circle with the mentioned radius r2 and the mentioned center point 0 around the axis x1. The quarter circle extends 90° starting from a point at which the tangent of the quarter circle is parallel to the axis x1 and closest to it, to an end point in proximity to the first shaft 12 in such a way that the generating quarter circle is parallel to the semicircle of the first transmission surface 14 in the plane illustrated in FIG. 1. The second transmission surface 18 is preferably connected to the shaft 16 in the region in which the tangent to the generating circle of the toroidally-shaped surface 18 is parallel to the axis x1, although it is also possible for the connection to be made via an area that extends further axially than is shown in FIG. 1.

The second transmission surface 18 serves as the surface of the torus facing away from the shaft 16, i.e., the concave toroidal surface 18 that faces the convexly curved surface 14. It is significant here that in the FIG. 1 cutting plane, i.e., the plane containing the axes of rotation x, x1, in at least a portion of the constant gap formed between the transmission surfaces 14, 18 the gap width is d and thus has parallel boundary surfaces. In the cutting plane the second transmission surface 18 and the first transmission surface 14 are parallel to each other at least along a line. The cutting plane corresponds to the plane in which the transmission of force and torque takes place. The ring-shaped transmission element 20 extends through the region between the concave and the convex transmission surfaces, including the gap of width d.

The transmission ring 20 is designed as a rigid element in the form of an annulus, and has a center point 03, which lies on the extension of the radii of the spherical first transmission surface 14 and the toroidal second transmission surface 18; it is offset from the common center point of the circle of radius r1 that generates the spherical surface and of the generating circle of the toroidal surface radius r2, by a distance e.

The wall thickness of the ring corresponds to the difference d between r1 and r2, so that when oriented in the radial direction the ring can be in good contact with the first and second transmission surfaces.

The ring 20 can be pivoted about the z axis (the axis perpendicular to the projection plane in FIG. 1 and to the plane spanning the axes x1, x through the center point 0 of the generating circle of the toroidal surface and of the spherical surface) by means of an adjusting unit 22 which is supported on the housing (not shown) by the mount 24. Thus, its contact point on the transmission surfaces 14, 18 within the gap that is formed between the first transmission surface 14 and the second transmission surface 18 is movable through an adjustment range. The adjustment range of the transmission ring 20 is the range of rotation of the ring around the axis z, i.e., an angular range of $0<\alpha \leqq 90°$ relative to the x axis. FIG. 1 shows with solid lines a position in which the ring 20 is inclined by the angle $\alpha \approx 45°$ from the x axis (the axis of rotation of the first transmission element). Two other angular positions ($\alpha \approx 10°$, $\alpha \approx 70°$) are shown with dashed lines.

The ring 20, which transmits the torque from the input shaft x to the output shaft x1, is in contact with first transmission surface 14 and second transmission surface 18 during the transmission of torque. A transmission ratio is set between the speed of the input shaft x and the output shaft x1, as a function of the angular position of the ring 20 (inclination of the ring relative to the x axis, angle $\alpha$). The transmission ratio is a function of the kinematic radii n1 and n2, which are determined respectively as the perpendicular distance of the contact point of transmission ring 20 on the first transmission surface 14 from axis x (n1) and the perpendicular distance of the contact point of transmission ring 20 on the second transmission surface 18 from axis x1 (n2).

To adjust the position of the ring, ring 20 must be rotated around the z axis. The torque necessary for the rotation around the z axis can be produced by means of an external electric motor, for example. In particular, when an adjustment is necessary the ring 20 is first tilted by means of the adjusting device from its position perpendicular to the tangent to the transmission surfaces 14, 18 at the contact point. The ring then automatically runs along with the rotation of the transmission surfaces until it has reached the new position prescribed by the transmission control, and there orients itself again in the position perpendicular to the tangent to the transmission surfaces 14, 18 at the new contact point. In the latter case the torque of the drive engine is used for the repositioning.

Figure 2:
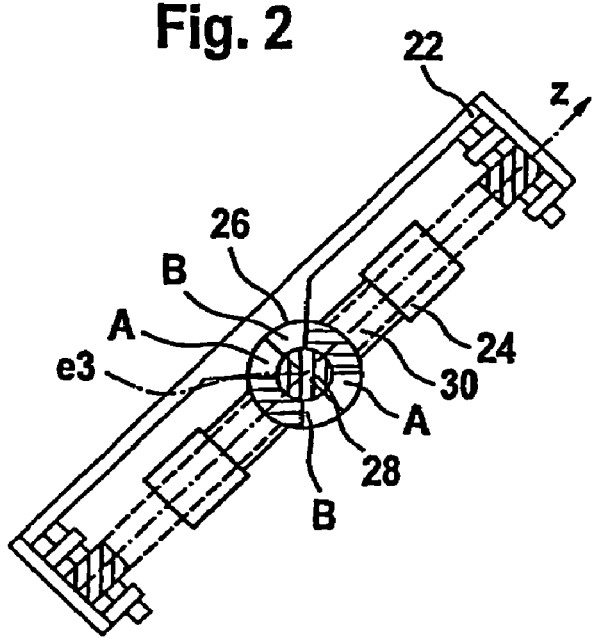
FIG. 2 shows an adjusting mechanism for the variable speed drive of FIG. 1.

The tilting of the ring 20 from that position is accomplished by the adjusting unit 22 which is shown in FIG. 2. Oil is routed under pressure into chamber A or chamber B of the adjusting unit, depending upon the direction of movement of the gas pedal. That causes cylinder element 26 to rotate around a pin 28, which is rigidly connected to a shaft 30 that has its axis of rotation in the z direction. That causes the adjusting unit 22 to rotate the ring 20 around the axis e3, which extends in the radial direction of the ring through the contact point on the transmission surfaces, and thereby tilts the ring. The ring then begins to rotate around the z axis until the gas pedal is no longer being moved. The transmission ratio thus varies as a function of the position of the ring 20, depending upon how quickly and how far the gas pedal is operated.

Ring 20 bears against the concave second transmission surface 18 with its outer circumferential surface, and bears against the convex first transmission surface 14 with its inner circumferential surface. To ensure good contact pressure of both transmission surfaces 14, 18 on the ring 20, second shaft 16 is preferably mounted so that it can be shifted in the axial direction, and is preloaded in the pressing direction so that good contact pressure is always ensured. Alternatively, first shaft 12 can also be mounted so that it can be shifted in the axial direction. The pressing direction is always such that the space between the transmission surfaces 14, 18 is reduced.

The movement of the movable shaft 16 in the axial direction can be produced by oil under pressure between the disks which form the transmission surfaces 14, 18 and their bearings. For example, in the embodiment shown in FIG. 1 oil can be fed into or withdrawn from the chamber 32, which is bounded by the side of the disk facing away from the second transmission surface 18, the shaft 16, and the bearing 34 for the shaft 16. The pressure in the chamber 32 can be regulated by a torque sensor with balls on suitable tracks, for example, as a function of the resistance torque. Thus, it is possible to apply the appropriate pressure to the variable speed drive in every operating situation.

Instead of the spherically curved first transmission surface 14 and the toroidal second transmission surface 18, transmission surfaces can also be chosen which have as their generating elements not circular but, for example, oval or elliptical surface areas, as long as care is taken to make sure that the walls of the convex transmission surface and the concave transmission surface are parallel, at least in the plane that extends between the axes x, x1, so that a gap d is produced in which the transmission element, which is in the form of a rigid transmission ring 20, is movably supported and can be pressed against the transmission surfaces. The pairing of a toroidal surface and a spherical surface simplifies the control for setting the transmission ratio, since the surface curvatures and hence the variation of the kinematic radii can be efficiently reproduced as a function of the position of the transmission ring. Furthermore, in every position along the spherical surface and the toroidal surface the contact pressure against the ring can be achieved by merely turning the ring around an axis perpendicular to the plane of the drawing in FIG. 1.

Figure 3:
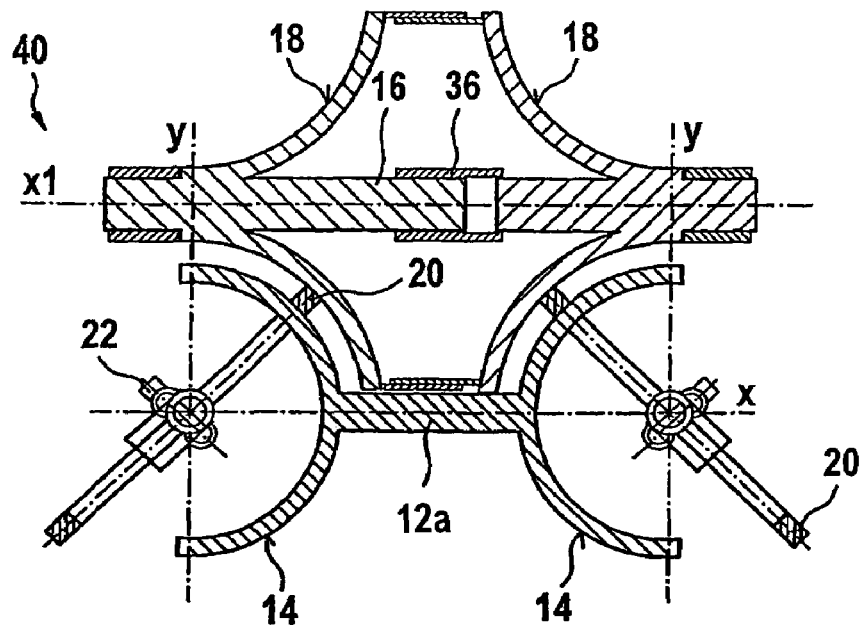
FIG. 3 shows an arrangement consisting of two variable speed drives.
Figure 4:
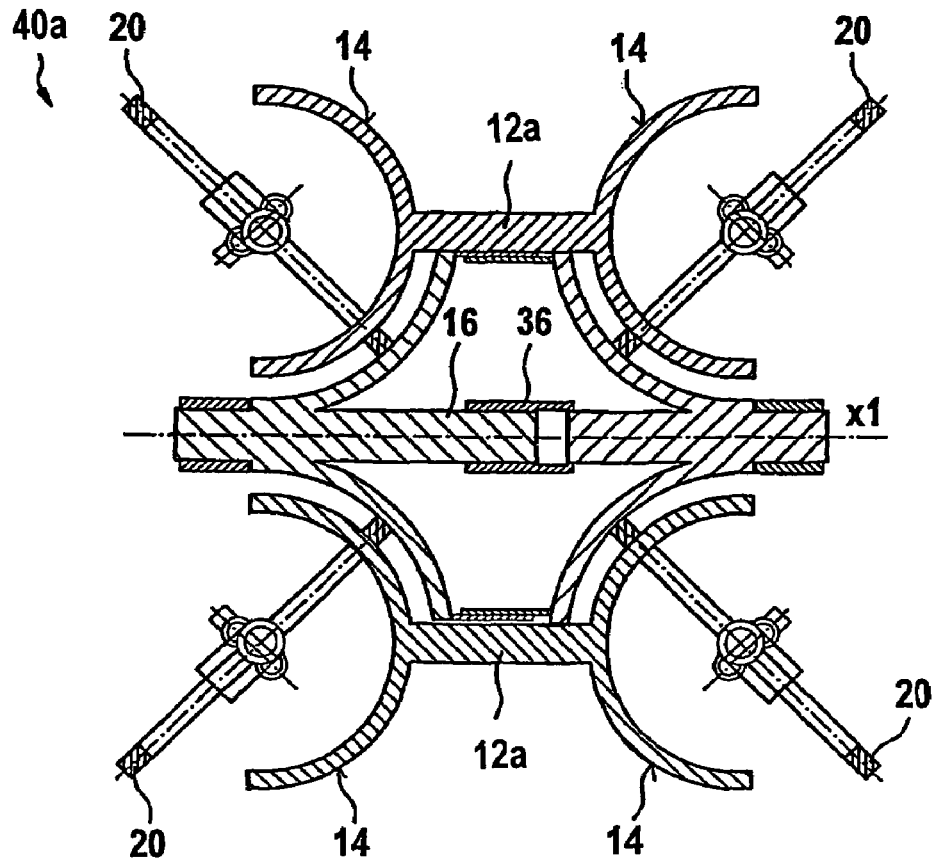
FIG. 4 shows an arrangement consisting of four variable speed drives.

FIGS. 3 and 4 show arrangements in which a plurality of variable speed drives 10 in accordance with FIG. 1 are combined into a variable speed drive arrangement 40, 40*a*, respectively. In the embodiment shown in FIG. 3, the convex first transmission surfaces 14 in particular are carried on a common input shaft 12*a* and are positioned laterally reversed relative to each other, the plane of symmetry being perpendicular to the axes x, x1.

The concave second transmission surfaces 18 are also situated laterally reversed relative to each other in reference to that plane, with the axis of rotation x1 in turn being parallel to the axis x, and both second transmission surfaces 18 having a common axis of rotation x1. However the second transmission surfaces 18 are movable in the axial direction with respect to each other, to ensure adequate contact pressure against the respective convex first transmission surfaces 14. To that end, the output shaft 16 is provided with a clutch element 36, which permits an axial displacement but is able to transmit rotational forces. For each pair of convex and concave transmission surfaces 14, 18 there is a ring element 20, to which an adjusting mechanism 22 is assigned.

That arrangement permits transmission of higher torques.

An alternative arrangement, in which a plurality of variable speed drives 10 are also mounted in parallel, is shown in FIG. 4, where the arrangement 40*a* corresponds substantially to the arrangement 40 in FIG. 3, and two additional variable speed drives 10 are situated symmetrically in reference to the x1 axis, i.e., the axis of rotation of the output shaft 16.

What is claimed is:

1. A variable speed drive for a continuously variable transmission, said variable speed drive comprising a first transmission element that is rotatable around a first axis of rotation and having a convexly-curved transmission surface that is rotationally symmetrical around the first axis of rotation, a second transmission element that is rotatable around a second axis of rotation and having a concavely-curved transmission surface that is rotationally symmetrical around the second axis of rotation, wherein the concavely-curved transmission surface of the second transmission element is a toroidal surface,
a rigid transmission ring positioned between and in contact with each of the curved transmission surfaces and movable within a displacement range relative to the transmission surfaces, which ring transmits a torque between the first and the second transmission surfaces, wherein lines of intersection of the transmission surfaces with a plane that extends through the axes of rotation are parallel, at least within the displacement range of the transmission ring, and wherein the spherically-curved surface and a generating circle of the toroidal surface have the same center of curvature, and for a radius r2 of the toroidal surface, r2=d+r1, where d is the smallest distance between the toroidal surface and the spherically-curved surface and r1 is the radius of the spherically-curved surface.

2. A variable speed drive in accordance with claim 1, wherein at least one of the first and the second transmission elements is movable in the axial direction of its the axis of rotation.

3. A variable speed drive in accordance with claim 1, wherein the convexly-curved transmission surface is a spherically-curved surface.

4. A variable speed drive in accordance with claim 1 wherein the transmission ring has a center of curvature that lies on an extension of the radii of the spherically-curved surface and of the generating circle of the toroidal surface.

5. A variable speed drive in accordance with claim 1, including an adjusting unit for displacing the transmission ring from a position perpendicular to a tangent at a contact point on the transmission surfaces.

6. A variable speed drive in accordance with claim 1, including a torque sensor provided on at least one of an input side and an output side to apply a contact pressure to the transmission surfaces.

7. A variable speed drive in accordance with claim 1, wherein the convexly-curved transmission surface is provided on a transmission input element and the concavely-curved transmission surface is provided on a transmission output element.

8. A variable speed drive in accordance with claim 1, wherein the convexly-curved transmission surface is provided on a transmission output element and the concavely-curved transmission surface is provided on a transmission input element.

9. A variable speed drive in accordance with claim 1, wherein the axes of rotation of the first and second transmission elements are parallel to each other.

10. A variable speed drive comprising a plurality of variable speed drives in accordance with claim 1.

11. A variable speed drive in accordance with claim 10, wherein two variable speed drives are provided which are situated axially symmetrically to each other, the axis of symmetry being perpendicular to the axes of rotation of the transmission elements.

12. A variable speed drive in accordance with claim 11, wherein four variable speed drives are provided, wherein transmission elements with concavely-curved transmission surfaces have a common axis of rotation, and wherein the variable speed drives are situated axially symmetrically relative to an axis of symmetry that is perpendicular to the axes of rotation of the transmission elements and axially symmetrically relative to the common axis of rotation.

13. A friction transmission system including at least one variable speed drive in accordance with claim 1.

14. A motor vehicle including a transmission having a variable speed drive in accordance with claim 1.

15. A variable speed drive arrangement for a continuously variable transmission, said variable speed drive arrangement including a plurality of variable speed drives each comprising:
a first transmission element that is rotatable around a first axis of rotation and having a convexly-curved transmission surface that is rotationally symmetrical around the first axis of rotation,
a second transmission element that is rotatable around a second axis of rotation and having a concavely-curved transmission surface that is rotationally symmetrical around the second axis of rotation,
a rigid transmission ring positioned between and in contact with each of the curved transmission surfaces and movable within a displacement range relative to the transmission surfaces, which ring transmits a torque between the first and the second transmission surfaces, wherein lines of intersection of the transmission surfaces with a plane that extends through the axes of rotation are parallel, at least within the displacement range of the transmission ring,
wherein two variable speed drives are provided which are situated axially symmetrically to each other, the axis of symmetry being perpendicular to the axes of rotation of the transmission elements.

16. A variable speed drive arrangement in accordance with claim 15, wherein at least one of the first and the second transmission elements is movable in the axial direction of its the axis of rotation.

17. A variable speed drive arrangement in accordance with claim 15, wherein the convexly-curved transmission surface is a spherically-curved surface.

18. A variable speed drive arrangement in accordance with claim 15, wherein the concavely-curved transmission surface of the second transmission element is a toroidal surface.

19. A variable speed drive arrangement in accordance with claim 18, wherein the convexly-curved surface of the first transmission element is a spherically-curved surface, and wherein the spherically-curved surface and a generating circle of the toroidal surface have the same center of curvature, and for a radius r2 of the toroidal surface, r2 =d +r1, where d is the smallest distance between the toroidal surface and the spherically-curved surface and r1 is the radius of the spherically-curved surface.

20. A variable speed drive arrangement in accordance with claim 19, wherein the transmission ring has a center of curvature that lies on an extension of the radii of the spherically-curved surface and of the generating circle of the toroidal surface.

21. A variable speed drive arrangement in accordance with claim 15, including an adjusting unit for displacing the transmission ring from a position perpendicular to a tangent at a contact point on the transmission surfaces.

22. A variable speed drive arrangement in accordance with claim 15, including a torque sensor provided on at least one of an input side and an output side to apply a contact pressure to the transmission surfaces.

23. A variable speed drive arrangement in accordance with claim 15, wherein the convexly-curved transmission surface is provided on a transmission input element and the concavely-curved transmission surface is provided on a transmission output element.

24. A variable speed drive arrangement in accordance with claim 15, wherein the convexly-curved transmission surface is provided on a transmission output element and the concavely-curved transmission surface is provided on a transmission input element.

25. A variable speed drive arrangement in accordance with claim 15, wherein the axes of rotation of the first and second transmission elements are parallel to each other.

26. A variable speed drive arrangement in accordance with claim 15, wherein four variable speed drives are provided, wherein transmission elements with concavely-curved transmission surfaces have a common axis of rotation, and wherein the variable speed drives are situated axially symmetrically relative to an axis of symmetry that is perpendicular to the axes of rotation of the transmission elements and axially symmetrically relative to the common axis of rotation.

27. A friction transmission system including at least one variable speed drive arrangement in accordance with claim 15.

28. A motor vehicle including a transmission having a variable speed drive arrangement in accordance with claim 15.

* * * * *